United States Patent [19]

Faust et al.

[11] 3,978,258
[45] Aug. 31, 1976

[54] EMBOSSED DECORATIVE SHEET-TYPE MATERIAL AND PROCESS FOR MAKING SAME

[75] Inventors: Kenneth J. Faust, Orwigsburg; Richard L. Maass, Emmaus, both of Pa.

[73] Assignee: GAF Corporation, New York, N.Y.

[22] Filed: Dec. 30, 1974

[21] Appl. No.: 537,536

[52] U.S. Cl. .................. 428/159; 428/160; 428/161; 156/79; 156/209; 156/220; 264/284; 264/321
[51] Int. Cl.² ............... B32B 5/20; B32B 31/20
[58] Field of Search ............... 161/119, 413, DIG. 3, 161/159, 161; 156/209, 219, 220, 79; 264/284, 321; 428/159, 160, 161

[56] References Cited
UNITED STATES PATENTS

| | | | |
|---|---|---|---|
| 3,104,192 | 9/1963 | Hacklunder | 156/219 |
| 3,196,030 | 7/1965 | Petry | 161/119 |
| 3,196,062 | 7/1965 | Kristal | 156/79 |
| 3,399,106 | 8/1968 | Palmer et al. | 161/119 |
| 3,408,248 | 10/1968 | Maass | 156/219 |
| 3,655,312 | 4/1972 | Erb et al. | 156/220 |
| 3,666,604 | 5/1972 | Coffet | 161/116 |
| 3,804,700 | 4/1974 | Hoey | 161/119 |
| 3,808,024 | 4/1974 | Witman | 161/119 |

*Primary Examiner*—Marion E. McCamish
*Assistant Examiner*—Stanley S. Silverman
*Attorney, Agent, or Firm*—Walter C. Kehm; Joshua J. Ward

[57] ABSTRACT

Embossed decorative sheet-type covering material such as sheet vinyl flooring is prepared by forming a foamed plastic layer over a pigmented layer on a substrate and then selectively crushing the foamed layer by mechanical embossing to produce selectively crushed transparent portions through which the pigmented layer is visible. Printing is normally included on the upper surface of the plastic layer before the latter is foamed and a conventional wear layer is also preferably used. In a preferred embodiment, a foamed undercoat layer is also used to reduce embossing requirements. Conventional materials are preferred, such as latex coated felt for the substrate, cured, foamed polyvinyl chloride organosol or plastisol for the foamed layers and cured, clear polyvinyl chloride organosol for the wear layer.

17 Claims, 3 Drawing Figures

EMBOSSED DECORATIVE SHEET-TYPE MATERIAL AND PROCESS FOR MAKING SAME

BACKGROUND OF THE INVENTION

This invention relates to an embossed, decorative sheet-type covering material and to a method for preparing such material.

Decorative sheet-type covering materials, such as vinyl floor coverings, are well known in the art and various attempts have previously been made to impart three-dimensional textured characteristics to the surface of such materials. For instance, U.S. Pat. No. 3,458,337 to Rugg suggests a method for producing a textured surface by employing a resin layer containing a catalyst activated foaming agent and then applying in selected pattern areas an agent for suppressing the catalytic action of the catalyst. Canadian Pat. No. 930,920 suggests a method for obtaining see through embossings in resinous foam products by the use of large amounts of inhibitors to completely inhibit foaming in selected areas of a resinous foam layer. Mechanical embossing, as taught for instance by U.S. Pat. Nos. 3,655,312 and 3,741,851 to Erb and Maass, has also been used to obtain three-dimensional textured surfaces. The disclosures of the above-mentioned U.S. patents are incorporated herein by reference.

Unfortunately, none of the known prior art techniques has proven entirely satisfactory. This has been especially true in situations wherein various special effects such as the see through effects described in the above-mentioned Canadian Pat. No. 930,920 are desired. The method of chemical inhibition described in the above-mentioned Canadian patent is not always entirely satisfactory from a production standpoint because, for successful use of that process, it is essential that foaming of the plastic be completely inhibited in the embossed areas. This requires a high concentration of inhibitor resulting in production difficulties since either multiple in register applications or thick inhibitor coating deposits such as silk screen deposits are necessary to prevent foaming. Also, use of chemical inhibition to prevent foaming and produce transparent or see through embossings presents additional inherent problems in that the foams used are limited to chemically blown foams and because of the critical nature of the inhibitor-catalyst-blowing agent relationships, the foam formulation is somewhat restricted and critical.

SUMMARY OF THE INVENTION

It is, accordingly, an object of the present invention to provide a decorative sheet-type covering material such as sheet vinyl flooring products having an embossed, textured finish with transparent areas and which is not subject to the above-mentioned disadvantages of the prior art.

In accordance with the invention, a decorative sheet-type covering material is provided which comprises a substrate, a pigmented layer and a foamed plastic layer having selectively crushed, transparent portions through which the pigmented layer is visible. The selectively crushed foamed layer preferably has printing thereon and a conventional wear layer is preferably present over such printing. In a preferred embodiment of the invention a foamed plastic undercoat is used under the foamed plastic layer. The undercoat may itself be pigmented to form the pigmented layer or the undercoat may have pigment or printing thereon to form the pigmented layer. The undercoat serves to relax the embossing requirements necessary for creating the crushed transparent portions of the foamed plastic layer and the undercoat consequently has partially crushed areas in register with the crushed transparent areas of the foamed plastic layer.

A process is also provided for making decorative sheet-type covering material such as vinyl floor covering. The process comprises forming a sheet-type material having a substrate, a pigmented layer and a foamed plastic layer adhered to the pigmented layer. The foamed layer is then selectively crushed to form crushed transparent portions thereof. The foamed plastic layer is preferably formed with a layer of printing thereon and a conventional clear plastic wear layer is preferably used over such printing. In a preferred embodiment the sheet is formed prior to crushing of the foamed layer with a foamed undercoat so that upon selective crushing of the foamed layer, the foamed undercoat is selectively partially crushed in register with the transparent crushed portions of the foamed layer.

DETAILED DESCRIPTION OF THE INVENTION

Figure 1:
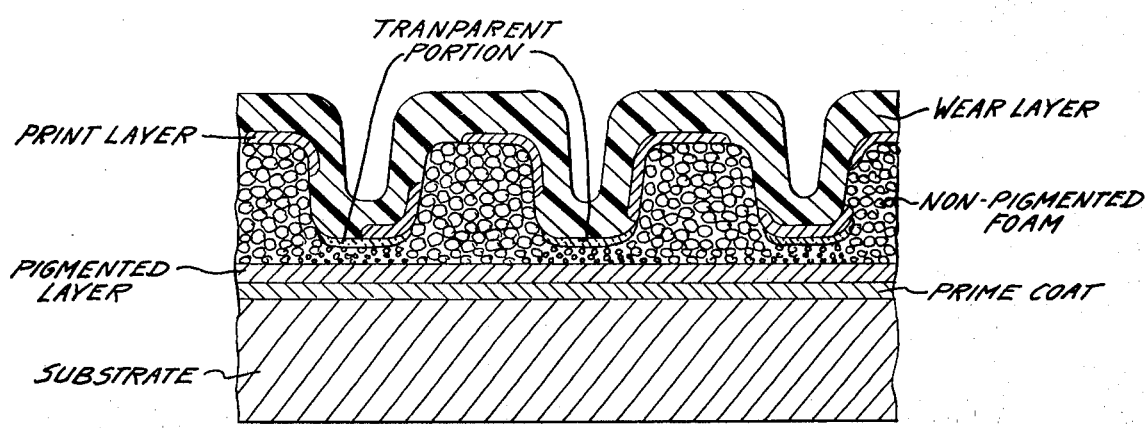
FIGS. 1 and 2 are fragmentary sectional views through preferred floor covering materials of the invention. In these views it is not intended that the thicknesses of the various layers of products shown are precisely represented. Rather, the various layers are represented on a considerably enlarged scale and without showing precise relationships between thicknesses of the various layers.

As mentioned above the preferred product of the invention is a decorative sheet-type covering material having an embossed surface and comprising a substrate on which is a cured, foamed plastic undercoat which is either pigmented or has a separate pigmented coating or printing thereon, a cured, foamed plastic layer having printing thereon and a clear wear layer. The foamed plastic layer has selectively crushed transparent portions in register with selectively partially crushed portions of the foamed undercoat where the undercoat is used.

The substrate may include suitable supporting materials such as an asbestos sheet, a nonwoven fibrous web, a woven fibrous web, a plastisol layer, plastisol on felt backing, etc. While almost any flexible base substrate may be used, the preferred substrate is felt, most advantageously an impregnated asbestos felt or a resin impregnated cellulose or other organic felt or, with suitable seal coats, an asphalt saturated organic felt. While felt is preferred, paper sheet, cloth or even metal foil may be used for some purposes such as wall coverings. Also, for some purposes, the product may be formed upon a temporary substrate such as release paper which may then be stripped from the product before use. Suitable substrates are generally known in the art and are described, for instance, in the above-mentioned U.S. patents.

The use of a sealing or priming coat on the substrate is not essential but is preferred, especially where a felt base is used. Where used, the seal or prime coat may be made up of a latex, for example a latex containing an acrylic polymer with or without pigments or fillers, such as the prime coat described in U.S. Pat. No. 3,458,337 to Rugg.

The pigmented coating used in the invention may be a layer of solid color, but more preferably, is made up of one or more patterns printed on the substrate or undercoat layer by conventional methods such as rotogravure, silk screen, etc. The pigmented coating may also be in the form of pigment contained in the undercoat.

The foamed plastic layer having selectively crushed transparent portions may be composed of any suitable material known in the art for producing foamed plastic layers on covering materials, but is preferably a cured polyvinyl chloride (PVC) plastisol or organosol. It is preferred that this layer be free of pigmentation, but minor amounts of pigment are permissable so long as the material is capable of being crushed to a dense, transparent condition so that the underlying pigment coating or printing can be seen through the crushed transparent portions of the layer. The PVC plastic may be any of the various PVC resin materials normally used in connection with coating of decorative sheet materials and may specifically include, but is not limited to those described in the above-mentioned U.S. Pat. No. 3,458,337. While a suitable blowing agent, as taught by the above-mentioned patents, may be used in the selectively crushed foamed layer, a blend of azodicarbonamide (ABFA) and p,p' oxybis (benzene sulfonyl hydrazide) (OBSH) blowing agents are considered especially desirable. A blend of these blowing agents produces a clear transparency in the crushed foam that is somewhat difficult to achieve with ABFA alone due to its yellowish color and retains a higher blow ratio than is usually obtainable with OBSH alone. Additionally, OBSH tends to lower the decomposition temperature of the ABFA, thereby causing more efficient and more complete decomposition of the ABFA during the fusing process. Where this preferred blend of blowing agents is used, ABFA is preferably used in amounts between about 0.5 and about 1.5 weight percent based upon the total weight of foamed and crushed foamed material while OBSH is preferably used in amounts between about 0.1 and about 1.0 weight percent on the same basis. Additional conventional ingredients, such as stabilizers, blowing agent catalyst, etc. such as taught by the above-mentioned patents may also, of course, be used. In a preferred embodiment of the invention, the PVC resin used comprises both dispersion and blending resin in ratios between about 1:2 and about 2:1 dispersion resin to blending resin. Where a foamed undercoat is used, the composition may be the same as the composition of the selectively crushed foamed layer or a different suitable foamed composition may be used.

A conventional printing design may optionally be placed upon the upper surface of the selectively crushed foamed layer in a conventional manner prior to the foaming of the layer. Such printing is preferred because of the unique effects that can be obtained by the use of both conventional printed designs on top of the selectively crushed foamed layer and the colors or designs which may be included in the pigmented coating visible through the transparent portions of the selectively crushed foamed layer. Where both a pigmented coating beneath and a layer of printing above the selectively crushed foamed layer are used, it is preferred that the pigmented coating be a printed design in register with the crushed, transparent portion of the foamed plastic layer. The pigmented coating may also conveniently be a solid color or a random-type pattern. The upper printed layer is preferably a design in order to take optimum advantage of the inherent registration characteristics of the product of the invention.

While chemically blown foams have been referred to above in connection with the selectively crushed foamed layer and foamed undercoat, it should be understood that mechanically foamed layers can also be used. Preferred foam raw materials for the most part, limited only by their color properties and any suitable materials capable of producing the desired degree of transparency when crushed may be used in forming the foamed layer having selectively crushed transparent portions.

For most applications, especially for use as flooring, the products of the invention should include a cured wear layer over the selectively crushed foamed plastic layer. The wear layer provides protection for the foamed layer and even more importantly for printed matter contained on the foamed layer including both foamed and crushed, transparent portions thereof. The wear layer may be any suitable clear plastic such as cured polyurethane or any suitable PVC plastisol or organosol. Such materials are well known in the art and are described, for instance, in the above-mentioned U.S. Pat. No. 3,458,337.

If desired, additional coatings, printings, decorative chips, etc. may be used in the manner well known in the art. For instance, an additional layer of foamed material may be provided immediately above the substrate, decorative chips may be embedded within or protrude from the selectively crushed foamed layer or the wear layer, etc. Also, the unique appearance obtainable by the products of the present invention may be combined with other effects obtainable by other known prior art techniques such as those mentioned above. For instance, if desired, inks containing blowing suppressants or inhibitors for blowing agent catalysts may be used on certain portions of the product to produce additional variations in possible designs.

Figure 2:
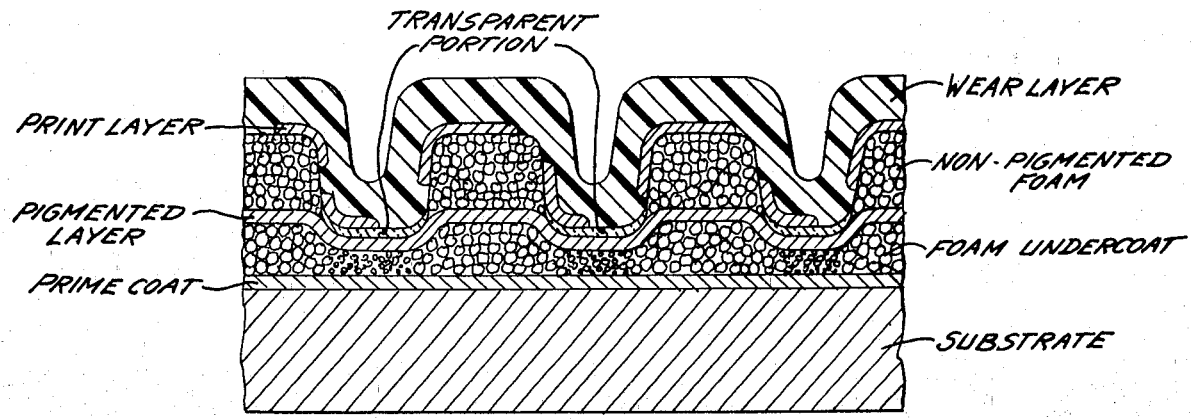
Figure 3:
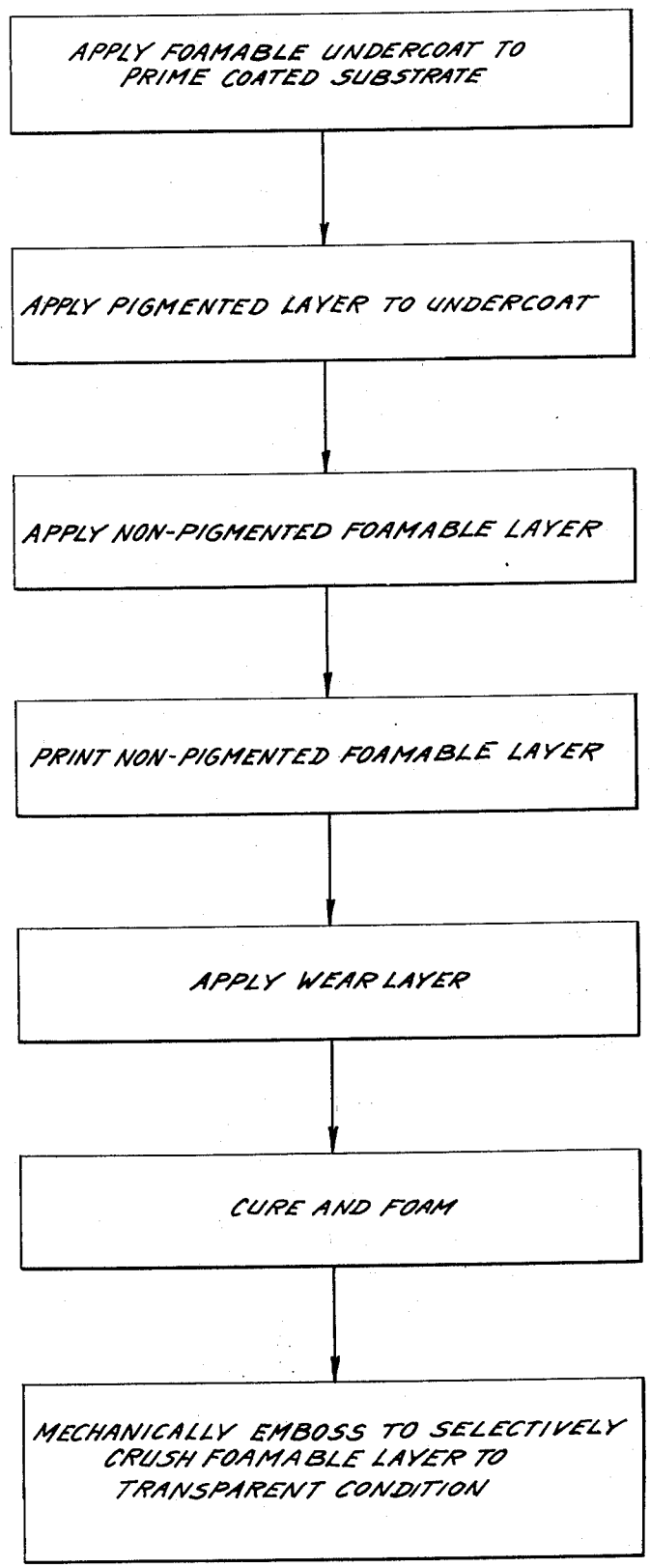
FIG. 3 is a flow sheet diagram representing a preferred process for making the product depicted in FIG. 2.

For a further appreciation of the unique structure and advantages of the material of the invention, reference may be had to the drawings and especially to FIGS. 1 and 2 thereof. FIG. 1 illustrates a section of a floor covering material of the invention which includes a substrate having a prime coat and pigmented coating thereon, a nonpigmented foamed layer with printed layer thereon and a wear layer. The nonpigmented foamed layer has selectively crushed transparent portions through which the underlying pigmented coating can be seen. FIG. 2 illustrates a similar product except that foamed undercoating has been used between the substrate and the pigmented coating. As can be seen from FIG. 2, the foamed undercoating has become partially selectively crushed in register with the selectively crushed transparent portions of the nonpigmented foamed layer.

As mentioned above, the basic process of the invention involves forming a sheet-type material having a substrate, a pigmented layer and a foamed plastic layer adhered to the pigmented layer. The foamed plastic layer is then selectively crushed to form crushed transparent portions thereof through which the pigmented layer can be seen. Also, as mentioned above, preferred embodiments include the formation of a foamed plastic undercoat, the formation of the foamed plastic layer to be crushed with printing thereon and application of a clear plastic wear layer, all prior to the selective crushing of the first mentioned foamed plastic layer.

In forming the various layers going to make up the material of the invention, conventional manufacturing techniques may be used. Thus, in a preferred embodiment of the invention, a conventional impregnated asbestos felt substrate between about 20 and about 40 mils thick is formed and coated with a latex seal coat which is usually less than about 2 mils thick. A foamable PVC undercoat is then applied wet at a thickness of between about 2 and about 20 mils and gelled by application of suitable temperatures such as between about 250° and about 325° F sufficient to gel the undercoat without foaming the same. The undercoat may be pigmented or the gelled undercoat may be printed with a solid color or a multicolor design by conventional printing techniques such as rotogravure printing. A preferably non-pigmented foamable PVC coating is then applied in a thickness between about 4 and about 20 mils and gelled as described above. Further printing may then be applied to this layer after which a PVC or polyurethane wear layer between about 4 and about 20 mils thick may be applied. The entire sheet is then heated to a temperature sufficient to cure and foam the various foamable layers and the wear layer. Typically, where catalytically activated blowing agents are used this is accomplished at temperatures between about 350° and about 400° F. Following the heating and curing of the sheet, the sheet is subjected to mechanical embossing to selectively crush the foamable plastic layer to form selectively crushed transparent portions thereof through which the pigmented coating or undercoat is visible. At the same time, the foamed undercoat is partially selectively crushed in register with the above-mentioned transparent portions of the foamed plastic layer. In a preferred embodiment of the invention where the foamed undercoating is used, the preferably nonpigmented foamed coating has selectively crushed, transparent portions which are no thicker than and preferably are thinner than the original thickness of the crushed layer prior to foaming. In this preferred embodiment the transparent portions are preferably between about 50 and about 90 percent of the original thickness of the foamed plastic layer before foaming thereof. By contrast, the foamed portions of the layer are preferably between about 2 and about 4 times the original unfoamed thickness thereof.

The product of the present invention has numerous advantages over previously known decorative sheet-type covering products. The foamed layer which is selectively crushed has plateau areas which exhibit graded white opacity increasing with increased foam thickness. This opacity stems from light scattering by the foam cells and varies directly with the number of cells. The transparent embossed areas have essentially no cells remaining and are essentially solid plastic with a minimum scattering effect and maximum transparency. Such effects are especially useful in the production of vinyl surfaced rotogravure printed, foamed, vinyl cushioned floor coverings mechanically embossed as described in the above-mentioned U.S. Pat. Nos. 3,655,312 and 3,741,851. The transparent embossing made possible by the present invention not only adds new decorative possibilities but eliminates the chance of embossing misregistration which is common to foam surface printed products as described in the above patents. The invention thus eliminates the need to emboss in register with a preprinted design on the foam surface, which is often distorted by stresses during the printing and wear layer coating processes. This is, of course, accomplished without the disadvantages inherent in depending upon chemical inhibition in the manner taught by the above-mentioned Canadian patent.

New decorative effects are also possible with the present invention. Thus, at relatively lower foam thicknesses, subtle undertones of preprinted patterns can be seen in the nonembossed areas and are in contrast with the more emphatic, clearer colors visible through the transparent embossed areas. Intricate multicolored designs can be produced by printing or applying more than one pigmented coating underneath the preferably nonpigmented, selectively crushed foam without problems of registration inherent in the separate in register printing for various colors which would otherwise be required. Because patterns can be printed and made apparent beneath the foam as well as on the foam surface, additional flexibility is gained in color variation and color design.

The following example illustrates the possible use of a preferred embodiment of the invention to produce a preferred product of the invention.

EXAMPLE

In this example the base material or substrate may be a 32 mil thick sheet of asbestos felt onto which is doctored a latex size coating less than 2 mils thick. A foamable PVC undercoat 3 mils thick may then be applied to the latex coated felt using an engraved diagonal cylinder and gelled using a hot pressure roll at a temperature 300°F. This layer has the following composition:

|  | Parts by Weight |
|---|---|
| PVC homopolymer dispersion resin | 50 |
| PVC homopolymer suspension resin | 50 |
| Dihexyl Phthalate plasticizer | 56 |
| Epoxidized soya oil | 6 |
| Zinc catalyst | 2.5 |
| Azodicarbonamide | 2.5 |
| Titanium dioxide | 7.5 |

A pigmented coating consisting of a multicolored design applied by conventional rotogravure printing is then applied followed by application of an additional 12 mil thick foamable PVC layer of the following composition:

|  | Parts by Weight |
|---|---|
| PVC homopolymer dispersion resin | 50.0 |
| PVC homopolymer blending resin | 50.0 |
| Dihexyl Phthalate | 55.0 |
| Azodicarbonamide | 2.5 |
| p,p' Oxybis (Benzene Sulfonyl Hydrazide) | 0.5 |
| Epoxidized Soy Bean Oil | 6.0 |
| Zinc catalyst | 2.5 |

This latter PVC layer is then gelled at 275°F for 3 minutes and is then overprinted with a design by conventional techniques after which a 15 mil thick clear PVC wear layer is applied. The wear layer has the following composition:

|  | Parts by Weight |
| --- | --- |
| PVC homopolymer dispersion resin | 100 |
| Dihexyl Phthalate | 56 |
| Light stabilizer | 5 |
| Epoxidized soya oil | 6 |
| mineral spirits | 3 |
| Alkylphenylether of polyethylene glycol | .6 |

Following application of the wear layer, the entire sheet is subjected to a temperature of 355° F for 3 minutes to cure the wear layer and to cure and foam the foamable layers. The sheet is then mechanically embossed before cooling by passing through a nip where a textured cylinder presses against the face of the sheet, thereby selectively crushing the foamed layer to produce selectively crushed, transparent portions thereof and at the same time selectively partially crushing the undercoat in register with the crushed portions of the foamed layer. The finished product would have a foamed undercoat ranging in thickness from 3 to 9 mils and a selectively crushed foamed layer in which the foamed portions are a maximum of 36 mils in thickness and the transparent crushed portions have a minimum thickness of 10 mils.

While the invention has been described above with respect to preferred embodiments thereof, it will be apparent to those skilled in the art that various changes and modifications may be made without departing from the spirit or scope of the invention.

What we claim is:

1. Decorative sheet-type covering material having an embossed surface and comprising:
   a. a substrate;
   b. a pigmented layer;
   c. a foamed plastic layer adhered to said pigmented layer and having selectively crushed transparent portions through which said pigmented layer is visible; and
   d. a selectively partially crushed foamed plastic undercoat under said pigmented layer with the selectively partially crushed portions thereof in register with the selectively crushed portions of said foamed plastic layer.

2. Material of claim 1 in which the foamed plastic layer comprises PVC.

3. Material of claim 2 which also includes a clear, cured wear layer over the foamed plastic layer, said wear layer being polyurethane or PVC.

4. Material of claim 3 including printing applied to the foamed plastic layer under the wear layer.

5. Material of claim 4 in which the substrate comprises felt coated with latex.

6. Material of claim 4 in which the pigmented layer comprises printing between the undercoat and the foamed plastic layer.

7. Material of claim 4 in which the substrate comprises felt coated with latex and the foamed plastic undercoat is adhered to the substrate and comprises cured PVC plastisol or organosol.

8. Material of claim 4 in which the selectively crushed transparent portions of the foamed plastic layer have a thickness less than the thickness of said layer prior to the foaming thereof.

9. Material of claim 4 in which the selectively crushed foamed layer is nonpigmented.

10. Decorative sheet-type covering material having an embossed surface and comprising:
    a. a substrate;
    b. a pigmented, selectively partially crushed, foamed, plastic undercoat adhered to said substrate; and
    c. a foamed, plastic layer adhered to said undercoat and having selectively crushed transparent portions through which said pigmented undercoat is visible, the selectively crushed transparent portions of said foamed plastic layer being in register with the selectively partially crushed portions of said pigmented undercoat.

11. A process for making decorative sheet-type covering material having an embossed surface which comprises:
    a. forming a sheet-type material having a substrate, a foamed plastic undercoat adhered to said substrate, a foamed plastic layer and a pigmented layer between the foamed plastic layer and the foamed undercoat; and
    b. selectively crushing said foamed plastic layer to form crushed transparent portions thereof through which the pigmented layer is visible while selectively partially crushing portions of said foamed undercoat in register with the crushed transparent portions of said plastic layer.

12. The process of claim 11 in which a clear plastic wear layer is formed over the foamed plastic layer prior to selective crushing of the foamed layer.

13. The process of claim 12 in which the foamed plastic layer is formed with a layer of printing thereon.

14. The process of claim 11 in which the substrate comprises latex coated felt and the foamed plastic layer and foamed undercoat and wear layer each comprise cured PVC organosol or plastisol.

15. A process for making decorative sheet-type covering material having an embossed surface which comprises:
    a. forming a foamable undercoat of wet PVC plastisol or organosol containing blowing agent on a latex coated felt substrate, said foamable undercoat being pigmented and being between about 2 and about 20 mils thick;
    b. heating the undercoat formed in step (a) under temperature conditions sufficient to gel said undercoat without foaming same;
    c. applying a wet, nonpigmented layer of foamable PVC plastisol or organosol over the pigmented undercoat, said nonpigmented foamable plastisol or organosol being between about 4 and about 20 mils thick;
    d. heating the layer of step (c) sufficient to gel same without foaming either the layer of step (c) or the undercoat of step (a);
    e. applying printing to the gelled, nonpigmented, foamable layer;
    f. applying a wet wear layer of PVC plastisol or organosol to the printed and gelled, nonpigmented, foamable layer, said wear layer having a thickness between about 4 and about 20 mils;
    g. heating the sheet sufficiently to cure the wear layer and cure and foam the undercoat and nonpigmented, foamable layers; and
    h. selectively crushing portions of the sheet by mechanical embossing to form transparent portions of the nonpigmented, foamed layer, at least some of such transparent portions having a thickness less than the thickness of the layer of step (c) and to simultaneously partially crush portions of the non-pigmented, foamed layer.

16. The product of the process of claim 15.

17. A process for making decorative sheet-type covering material having an embossed surface which comprises:
   a. forming a sheet-type material having a substrate, a pigmented foamed undercoat adhered to said substrate and a foamed plastic layer adhered to said pigmented undercoat; and
   b. selectively crushing said foamed plastic layer to form crushed transparent portions thereof through which said pigmented undercoat is visible while selectively partially crushing portions of said undercoat in register with the crushed transparent portions of the plastic layer.

* * * * *